US012654983B2

(12) United States Patent
Siikonen et al.

(10) Patent No.: US 12,654,983 B2

(45) Date of Patent: Jun. 16, 2026

(54) CONTROL OF AN ELEVATOR SYSTEM

(71) Applicant: KONE CORPORATION, Helsinki (FI)

(72) Inventors: Marja-Liisa Siikonen, Helsinki (FI); Janne Sorsa, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1620 days.

(21) Appl. No.: 17/092,442

(22) Filed: Nov. 9, 2020

(65) Prior Publication Data

US 2021/0053794 A1 Feb. 25, 2021

Related U.S. Application Data

(63) Continuation of application No. PCT/FI2018/050466, filed on Jun. 15, 2018.

(51) Int. Cl.

*B66B 1/24* (2006.01)

*B66B 9/00* (2006.01)

(52) U.S. Cl.

CPC ............ *B66B 1/2491* (2013.01); *B66B 9/003* (2013.01); *B66B 2201/211* (2013.01); *B66B 2201/301* (2013.01)

(58) Field of Classification Search

CPC . B66B 1/2491; B66B 9/003; B66B 2201/211; B66B 2201/301

See application file for complete search history.

(56) References Cited

U.S. PATENT DOCUMENTS

| | | | | |
|---|---|---|---|---|
| 4,991,694 | A * | 2/1991 | Friedli | B66B 1/2458 187/387 |
| 8,397,874 | B2 * | 3/2013 | de Groot | B66B 1/2458 187/382 |
| 12,071,322 | B2 * | 8/2024 | Kallioniemi | B66B 5/0087 |
| 2005/0109562 | A1 * | 5/2005 | Siikonen | B66B 1/2408 187/383 |
| 2017/0001829 | A1 | 1/2017 | Jetter et al. | |

FOREIGN PATENT DOCUMENTS

| | | | |
|---|---|---|---|
| CN | 205973350 | U * | 2/2017 |
| JP | 7-277809 | A | 10/1995 |
| JP | 07277609 | A * | 10/1995 |

(Continued)

OTHER PUBLICATIONS

Japanese Office Action for Japanese Application No. 2020-567758 dated Nov. 15, 2022.

(Continued)

*Primary Examiner* — Bickey Dhakal

(74) *Attorney, Agent, or Firm* — Birch, Stewart, Kolasch & Birch, LLP

(57) ABSTRACT

The invention relates to an elevator system comprising: a plurality of elevator sub-systems and a group controller configured to control the plurality of the elevator sub-systems, wherein the group controller is configured to: determine an efficiency of the elevator system; and control, in accordance with the efficiency of the elevator system, at least one elevator sub-system to serve elevator calls at different zones from at least one other elevator sub-system. The invention also relates to a method, a group controller and a computer program product.

7 Claims, 3 Drawing Sheets

(56) References Cited

FOREIGN PATENT DOCUMENTS

| | | | |
|---|---|---|---|
| JP | 8-198529 | A | 8/1996 |
| JP | 2005-531472 | A | 10/2005 |
| JP | 2007-230753 | A | 9/2007 |
| JP | 2017-178475 | A | 10/2017 |
| KR | 10-2014-0020649 | A | 2/2014 |
| WO | WO 2015/084388 | A1 | 6/2015 |

OTHER PUBLICATIONS

European Office Action for European Application No. 18 736 970.7, dated Jun. 17, 2022.

* cited by examiner

CONTROL OF AN ELEVATOR SYSTEM

CROSS REFERENCE TO RELATED APPLICATIONS

This application Continuation of PCT International Application No. PCT/FI2018/050466, filed on Jun. 15, 2018, which is hereby expressly incorporated by reference into the present application.

TECHNICAL FIELD

The invention concerns in general the technical field of elevators. More particularly, the invention concerns controlling of an elevator system.

BACKGROUND

One known elevator type is so called multicar elevator system in which a plurality of elevator cars travels in the same elevator shaft. The multicar elevator system may, in principle, be implemented in two different ways. A first implementation is such that multiple elevator cars travel upwards in one shaft and downwards in another shaft and the shafts are connected to each other with transfer channels through which the elevator cars move between the shafts. A second implementation of the multicar elevator system is so called multi-deck elevator system in which a plurality of cars is attached to each other and the cars travel in the same shaft upwards and downwards.

A traditional way to establish the first implementation is a so-called paternoster type elevator system in which elevator cars are arranged in chain and the move slowly along a circular path so that the elevator cars do not stop at floors, but the passengers jump in and out in motion. However, this kind of arrangement has challenges in safety, and the modern multicar elevator systems in which the elevator cars travel in the circular path allow independent motion of the elevator cars within the shafts. The modern multicar elevator systems are based on a solution in which the elevator car carries at least part of the elevator motor, such as a linear motor, generating power for moving the elevator car in the shaft.

However, the multicar elevator system in which the elevator cars travel along a circular path in two shafts connected to each other has several drawbacks. This is because the elevator cars cannot bypass each other even though they can travel independently to each other and this may cause delay in service time of passengers. In other words, the implementation limits the allocation of elevator cars in response to an elevator call.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an elevator system, a method, a group controller and a computer program product for controlling an elevator system.

The objectives of the invention are reached by an elevator system, a method, a group controller and a computer program product as defined by the respective independent claims.

According to a first aspect, an elevator system is provided, the elevator system comprising: a plurality of elevator sub-systems, each elevator sub-system comprising at least one elevator car arranged to travel in a loop path comprising a first vertical section and a second vertical section connected to each other with two horizontal sections, wherein the at least one elevator car is configured to travel upwards in the first vertical section of the loop path and downwards in the second vertical section of the loop path; a group controller configured to control the plurality of the elevator sub-systems; wherein the group controller is configured to: determine an efficiency of the elevator system; and control, in accordance with the efficiency of the elevator system, at least one elevator sub-system to serve elevator calls at different zones from at least one other elevator sub-system.

The group controller may be configured to determine the efficiency of the elevator system by: determining a value for each zone, the value representing an efficiency of the elevator system with respect to the zone; comparing each of the determined values to a corresponding reference value; and setting a detection result to represent the efficiency of the elevator system with respect to each zone. For example, the corresponding reference value may be one of the following: a common reference value for all zones, a dedicated reference value defined individually for each zone.

Alternatively or in addition, the value used for determining the efficiency of the elevator system may be a waiting time in the zone.

According to a second aspect, a method for controlling at least one elevator sub-system of an elevator system is provided; the elevator system comprising: a plurality of elevator sub-systems, each elevator sub-system comprising at least one elevator car arranged to travel in a loop path comprising a first vertical section and a second vertical section connected to each other with two horizontal sections, wherein the at least one elevator car is configured to travel upwards in the first vertical section of the loop path and downwards in the second vertical section of the loop path; the method comprises: determining an efficiency of the elevator system; and controlling, in accordance with the efficiency of the elevator system, at least one elevator sub-system to serve elevator calls at different zones from at least one other elevator sub-system.

The efficiency of the elevator system may be determined by: determining a value for each zone, the value representing an efficiency of the elevator system with respect to the zone; comparing each of the determined values to a corresponding reference value; and setting a detection result to represent the efficiency of the elevator system with respect to each zone. For example, the corresponding reference value may be one of the following: a common reference value for all zones, a dedicated reference value defined individually for each zone.

Alternatively or in addition, the value used for determining the efficiency of the elevator system may be a waiting time in the zone.

According to a third aspect, a computer program product for controlling an elevator system is provided, which, when executed by at least one processor, cause a group controller to perform the method as described above.

According to a fourth aspect, a group controller is provided, the group controller comprising: at least one processor; at least one memory including computer program code;

the at least one memory and the computer program code configured to, with the at least one processor, cause the group controller to perform: determine an efficiency of the elevator system; and control, in accordance with the efficiency of the elevator system, at least one elevator subsystem to serve elevator calls at different zones from at least one other elevator sub-system.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
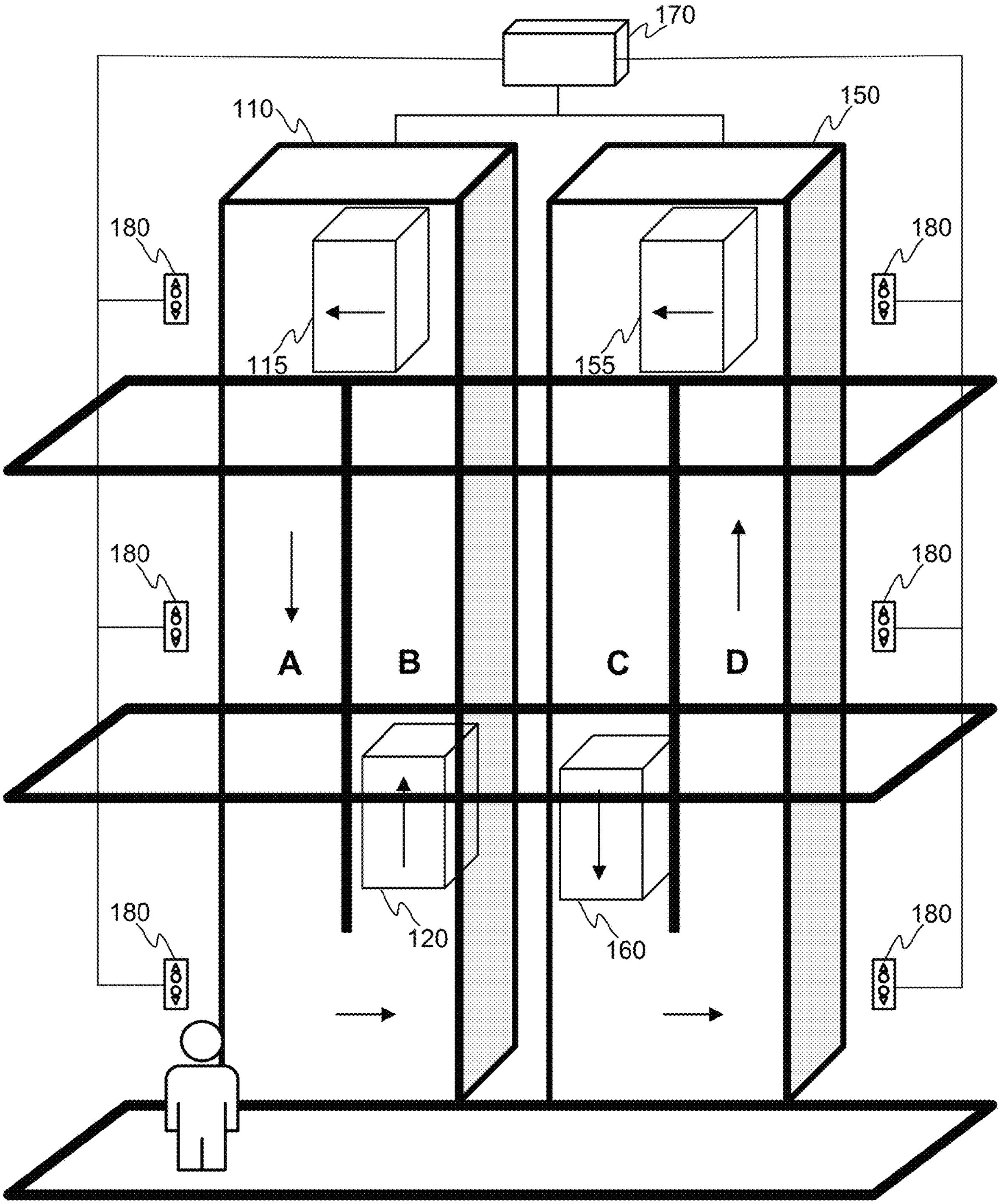
FIG. 1 illustrates schematically an example of an elevator system according to the invention.

FIG. 1 illustrates schematically an example of an elevator system according to the present invention. The elevator system comprises a plurality of subsystems 110, 150, wherein the sub-system refers to an elevator system comprising two shafts A, B; C, D, i.e. vertical sections, in which at least one elevator car 115, 120, 155, 160 is arranged to travel in a loop path. The loop path refers to an implementation in which the elevator car 115, 120, 155, 160 in question is arranged to travel upwards in a first vertical section, such as in a first shaft B; D, and downwards in a second vertical section, such as in a second shaft A, C. The elevator car 115, 120, 155, 160 may be transferred between the first vertical section B, D and the second vertical section A, C through horizontal sections, known also as transfer channels, arranged between the vertical sections. The horizontal sections, i.e. transfer channels, may e.g. be arranged at the upper section and at the lower section of the shafts, as schematically illustrated in FIG. 1. The power generation means for moving the elevator car 115, 120, 155, 160 in each sub-system may be any suitable means. For example, the linear motor may be used in the context of the present invention. However, the invention is not limited to that only, but any means which may be controlled with a control device for controlling the motion of the elevator car may be applied to. Moreover, even if it is illustrated two elevator sub-systems 110, 150 in FIG. 1, the number of sub-systems is not anyhow limited in view of an inventive idea of the present idea.

FIG. 1 also illustrates schematically at least some aspects of a control system implementing controlling of the elevator system at least in part. A device called a group controller 170 may be configured to control an operation of the elevator system at least in part. The group controller 170 may be configured to receive input signals and generate output signals to pre-determined entities. For example, passengers may indicate with an elevator call device 180 that they need a service from the elevator system. The elevator call devices 180 may e.g. reside at floors from which the passengers may enter the elevator cars 115, 120, 155, 160 and exit from them. The call signals are delivered to the group controller 170, which may be configured to perform operations for determining an elevator car 115, 120, 155, 160 which serves the elevator call in question. In response to the determination of the elevator car the group controller 170 may be configured to generate output signals, such as control signals, for instructing one or more elevator cars 115, 120, 155, 160 to operate so that the elevator call is served. The control signal may e.g. refer to a signal carrying information for controlling power generation means of one or more elevator cars 115, 120, 155, 160. The group controller may also be configured to communicate with any external entities, such as with data centre configured to monitor and control of the elevator system and/or any sub-systems therein. The communication to and from the group controller 170 may be arranged in a wireless or in a wired manner so that the communication between the entities may be established as described.

According to an embodiment of the invention the group controller 170 may be configured to determine one or more values representing a quality of service of the elevator system. The quality of service may refer to at least one value indicating how efficiently the elevator system may serve a passenger or passengers. The value for the quality of service may e.g. represented by means of a determined value representing at least one waiting time of at least one passenger i.e. how long at least one passenger needs to wait until he/she gets served by the elevator system after giving a service request, such as an elevator call, on a need of service. The determined value, or values, may be compared to a reference value, or reference values, and in accordance with the comparison a detection result may be set to express an efficiency of the elevator system. On the basis of the detection result the group controller 170 may be configured to control, such as adjust, an operation of the elevator system comprising the at least two sub-systems 110, 150. According to an embodiment of the present invention the group controller 170 may be configured to control the operation of the elevator system so that it allocates the plurality of sub-systems 110, 150 to serve elevator calls at different zones between the sub-systems 110, 150. In other words, the control of the operation of the elevator system causes at least one elevator sub-system 110, 150 to serve one or more zones differently from at least one other elevator sub-system 110, 150. A non-limiting example of the adjustment may be that one elevator sub-system 110, 150 may be controlled to serve only every second floor of the building whereas the other elevator sub-system or elevator sub-systems are adjusted to serve every floor. Hence, the present invention provides a mechanism to adjust the elevator system to serve passengers in an efficient way through a dynamic zoning, as described. The dynamic zoning may refer in this context to an adjustment in which the sub-systems server zones in a different way.

The dynamic zoning may be implemented so that the group controller 170 is configured to maintain data table for each of the sub-systems 110, 150 so that the data tables maintain information, for each of the sub-systems 110, 150, which zones, such as floors, are to be served by the sub-system 110, 150 in question at an instant of time. Now, when the group controller 170 processes a received elevator call it takes into account the information on the data tables when selecting a sub-system 110, 150 to serve the elevator call i.e. into which sub-system, and even into which elevator car 115, 120, 155, 160 in the selected sub-system, it allocates the serve of the elevator call.

Figure 2:
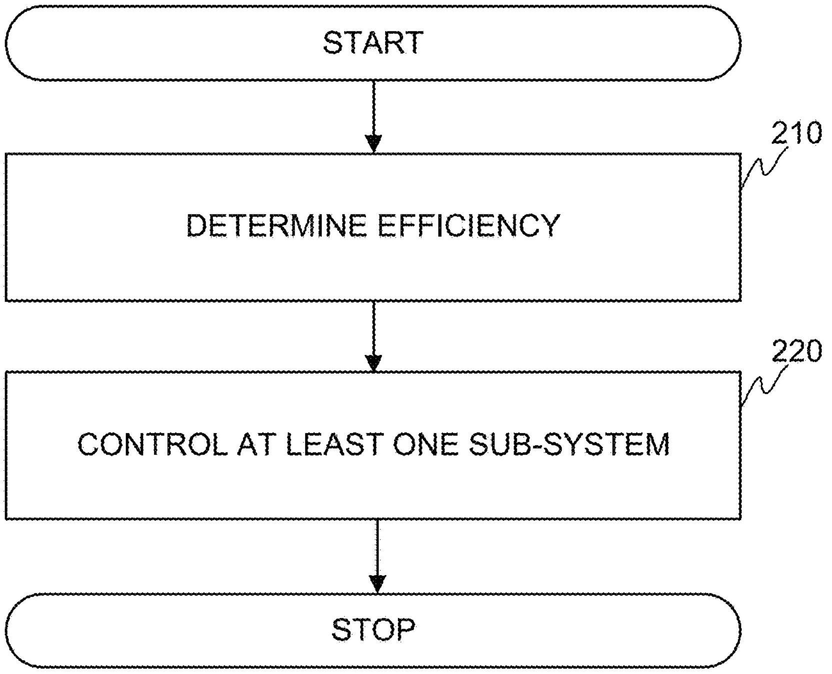
FIG. 2 illustrates schematically an example of a method according to an embodiment of the invention.

Next, an example of the method according to an embodiment of the present invention is described by referring to FIG. 2. The method relates to controlling at least one elevator sub-system 110, 150 belonging to an elevator system. The elevator system comprises, as discussed in the context of FIG. 1, a plurality of elevator sub-systems 110, 150 wherein each elevator sub-system comprising at least one elevator car 115, 120; 155, 160 arranged to travel in a loop path comprising a first vertical section and a second vertical section connected to each other with two horizontal sections, and wherein the at least one elevator car 115, 120; 155, 160 is configured to travel upwards in the first vertical section of the loop path and downwards in the second vertical section of the loop path. In the method it is determined 210 an efficiency of the elevator system, and controlled 220, in accordance with the efficiency of the elevator system, at least one elevator sub-system 110, 150 as described above to serve elevator calls at different zones from at least one other elevator subsystem 110, 150.

Figure 3:
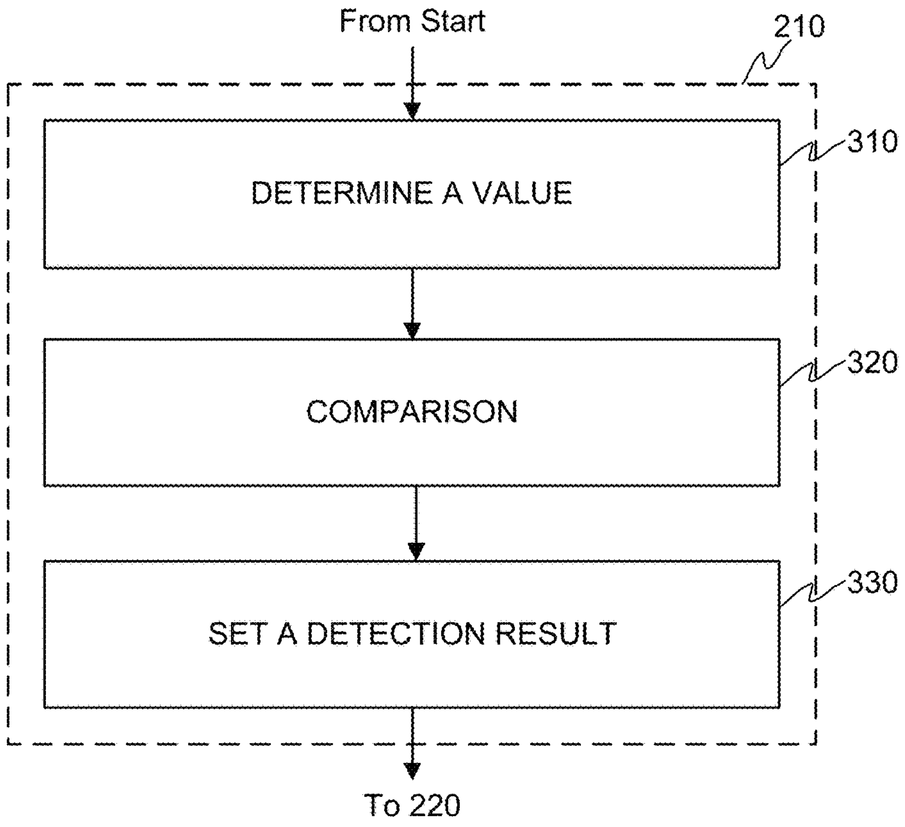
FIG. 3 illustrates schematically an aspect of a method according to an embodiment of the invention.

In the method the group controller 170 may be configured to determine 210 the efficiency of the elevator system by determining predetermined parameters based on which the efficiency may be determined. An example of the determination of the efficiency 210 is schematically illustrated in FIG. 3. In the determination of the efficiency 210 it may first be determined a value 310 representing, for example, at least one waiting time of at least one passenger from a service request to a provision of a requested service to the at least one passenger by the elevator system. In other words, when the group controller 170 receives the service request indicated e.g. by the passenger it may initiate a timer, instruct one of the sub-systems, and an elevator car 115, 120; 155, 160, therein and monitor the provision of the service until it is completed which may refer to a situation that the passenger enters an elevator car 115, 120; 155, 160 or even reaches his/her destination. When the service provision is completed the timer is stopped. The group controller 170 may be configured to determine one or a plurality of values e.g. in the above described method and use those as such, or perform some statistical analysis of the them, such as calculate an average over a predetermined period of time, and generate a value representing the waiting time. Next, the group controller 170 may be configured to inquire a reference value from data storage into which it has access and which data storage is configured to store one or more reference values. The inquiry may comprise a parameter defining either directly or indirectly the reference value inquired from the data storage. In response to a receipt of the reference value the group controller may be configured to compare 320 the determined value to a reference value and set a detection result 330 to represent the efficiency of the elevator system. The outcome of the comparison may be that the waiting time exceeds or is less than the reference value. In other words, the reference value may define a maximum acceptable waiting time and result of the comparison is indicated by setting the detection result. The detection result may e.g. be that the passengers are not currently served at a desired level i.e. the determined value 310 exceeds the reference value or the detection result may be that the elevator system serves the passengers at a desired level. In response to a detection that the passengers are not served at the desired level, the group controller 170 may be configured to generate a control signal for controlling at least one sub-system 220 to change its operational mode i.e. the group controller 170 may be configured to define that at least one elevator sub-system 110, 150 is allowed to serve elevator calls at different zones from at least one other elevator sub-system 110, 150. In other words, the at least one elevator sub-system 110, 150 may be instructed to serve different zones than at least one other elevator sub-system 110, 150 for causing the elevator system to operate within a predetermined efficiency i.e. the passengers get served within an acceptable service level.

According to an embodiment of the present invention an efficiency of the elevator system may be determined on a zone basis. The zone may e.g. refer to a floor or to a plurality of floors defined as a zone. According to the embodiment the group controller 170 may be configured to determine at least one value representing an efficiency of the elevator system with respect to the defined zone or zones. For example, the group controller 170 may determine waiting time for each zone e.g. in the manner as described above and perform the comparison 320 e.g. in the manner as described. In some embodiment there are common comparison value for all zones, but it may also be arranged that there a dedicated comparison value for each zone i.e. an individual reference value for each zone. The comparison value or values may be stored in a data storage accessible to the group controller 170, which may retrieve the comparison value or values from the memory for performing the comparison in the manner as schematically illustrated in FIG. 3. In response to the comparison 320 the group controller 170 may be configured to set a detection result 330 on the zone basis for indicating if the service provided by the elevator system meets requirements or not in view of the zones. It may turn out that the group controller 170 determines that the service level of at least one zone is not within an acceptable level and in response to such a detection the group controller 170 may optimize an operation of the at least one sub-system 110, 150 so that the at least one zone experiencing unacceptable service level gets improved service. In other words, the group controller 170 may be configured to instruct the at least one sub-system 110, 150 to change it operational mode so that the at least one elevator sub-system 110, 150 is allowed to serve elevator calls originating only at those zones which have an unacceptable service rate e.g. based on the comparison 320. Naturally, the group controller 170 may also defined some specific rules in addition to the above mentioned arranged, such as it is always allowable to enter a zone having the entrance, such as the ground floor, with the elevator sub-system 110, 150 whose operational mode is set as described. According to the embodiment the service level of the elevator system may be optimized and balanced thought the dynamic zoning.

Figure 4:
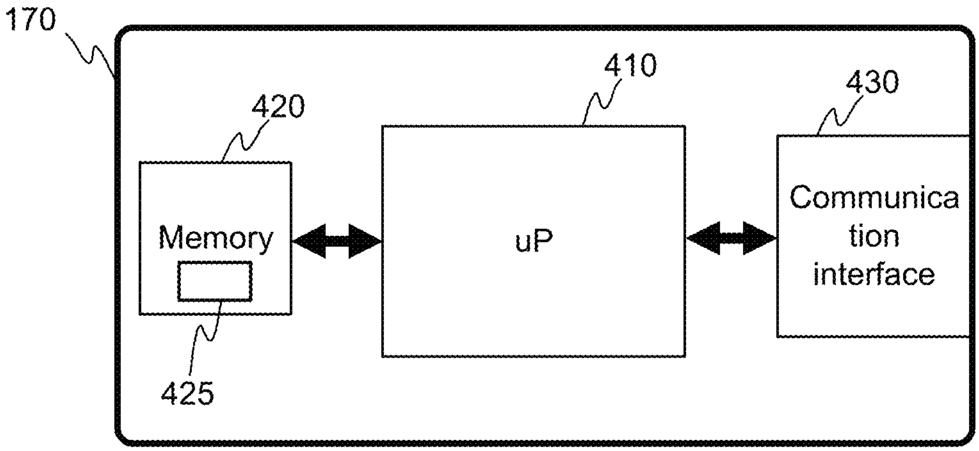
FIG. 4 illustrates schematically a group controller according to an embodiment of the invention.

FIG. 4 schematically illustrates an example of a group controller 170 according to an embodiment of the invention.

The group controller 170 may at least be configured to receive data from an elevator system and process the received data to perform the method as described. The group controller 170 may comprise one or more processors 410, one or more memories 420 and one or more communication interfaces 430 which entities may be communicatively coupled to each other with e.g. a data bus. The communication interface 430 may comprise necessary hardware and functionality for coupling the group controller 170 to the elevator system, and entities therein. The communication interface 430 may be configured to implement either wired or wireless communication protocol or even both and has necessary hardware thereto. Further, the operation of the group controller 170 in the manner as described may be at least partly controlled by the one or more processors 410 e.g. by executing portions of computer program code 425 stored in the one or more memories 420. In other words, the computer program code 425 may define instructions that cause the group controller 170 to operate as described when at least one portion of the computer program code 425 is executed by the processor(s) 410. The group controller 170 as schematically illustrated in FIG. 4 does not comprise all elements of the group controller 170. For example, the power related elements needed for bringing the group controller 170 into operation are not shown in FIG. 4. Moreover, in some embodiment of the invention the group controller 170 may be configured so that it comprises a plurality of processors 410 wherein each processor 410 is arranged to receive data from the elevator system, and entities there. In this manner it is possible to increase an efficiency of data processing at the group controller 170 as well as to improve a reliability of the elevator system.

Some aspects of the present invention may relate to a computer program product stored in a computer readable medium which when executed by at least one processor, such as the processor 410 of the group controller 170 cause the group controller 170 to perform the method as described above.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An elevator system comprising:

a plurality of elevator sub-systems, each elevator sub-system comprising at least one elevator car arranged to travel in a loop path comprising a first vertical section and a second vertical section connected to each other with two horizontal sections, wherein the at least one elevator car is configured to travel upwards in the first vertical section of the loop path and downwards in the second vertical section of the loop path, a group controller configured to control the plurality of the elevator sub-systems, wherein the group controller is configured to:

determine an efficiency of the elevator system, and control, in accordance with the efficiency of the elevator system, at least one elevator sub-system to serve elevator calls at different zones from at least one other elevator sub-system by dynamically allocating a specific pattern of floors to be serviced by the at least one elevator sub-system based on the determined efficiency of the elevator system, wherein said allocation differs from a floor pattern serviced by the at least one other elevator sub-system, wherein the group controller is configured to determine an efficiency of the elevator system on a zone-by-zone basis by:

determining at least one value for each of a plurality of zones, each zone including a specific pattern of floors;

comparing each determined zone-specific value to a corresponding reference value for that zone; and setting a detection result for each zone indicating an efficiency for that zone based on the comparison, wherein the corresponding reference value is a dedicated reference value defined individually for each zone.

2. The elevator system of claim 1, wherein the value used for determining the efficiency of the elevator system is a waiting time in the zone.

3. A method for controlling at least one elevator sub-system of an elevator system, the elevator system comprising:

a plurality of elevator sub-systems, each elevator sub-system comprising at least one elevator car arranged to travel in a loop path comprising a first vertical section and a second vertical section connected to each other with two horizontal sections, wherein the at least one elevator car is configured to travel upwards in the first vertical section of the loop path and downwards in the second vertical section of the loop path, the method comprises:

determining an efficiency of the elevator system, and controlling, in accordance with the efficiency of the elevator system, at least one elevator sub-system to serve elevator calls at different zones from at least one other elevator sub-system by dynamically allocating a specific pattern of floors to be serviced by the at least one elevator sub-system based on the determined efficiency of the elevator system, wherein said allocation differs from a floor pattern serviced by the at least one other elevator sub-system, wherein the step of determining an efficiency of the elevator system is performed on a zone-by-zone basis by:

determining at least one value for each of a plurality of zones, each zone including a specific pattern of floors;

comparing each determined zone-specific value to a corresponding reference value for that zone; and setting a detection result for each zone indicating an efficiency for that zone based on the comparison, wherein the corresponding reference value is a dedicated reference value defined individually for each zone.

4. The method of claim 3, wherein the value used for determining the efficiency of the elevator system is a waiting time in the zone.

5. A computer program product for controlling an elevator system which, when executed by at least one processor, cause a group controller to perform the method according to claim 4.

6. A computer program product for controlling an elevator system which, when executed by at least one processor, cause a group controller to perform the method according to claim 3.

7. A group controller comprising:

at least one processor;

at least one memory including computer program code;

the at least one memory and the computer program code configured to, with the at least one processor, cause the group controller to perform:

determine an efficiency of the elevator system, and control, in accordance with the efficiency of the elevator system, at least one elevator sub-system to serve elevator calls at different zones from at least one other elevator sub-system by dynamically allocating a specific pattern of floors to be serviced by the at least one elevator sub-system based on the determined efficiency of the elevator system, wherein said allocation differs from a floor pattern serviced by the at least one other elevator sub-system, wherein the group controller is configured to determine an efficiency of the elevator system on a zone-by-zone basis by:

determining at least one value for each of a plurality of zones, each zone including a specific pattern of floors;

comparing each determined zone-specific value to a corresponding reference value for that zone; and setting a detection result for each zone indicating an efficiency for that zone based on the comparison, wherein the corresponding reference value is a dedicated reference value defined individually for each zone.

* * * * *